(12) United States Patent
Bucknell

(10) Patent No.: US 8,215,293 B2
(45) Date of Patent: Jul. 10, 2012

(54) SYSTEM AND METHOD FOR CONTROLLING A SUPERCHARGED ENGINE WITH INLET AND PORT THROTTLE

(75) Inventor: John R Bucknell, Royal Oak, MI (US)

(73) Assignee: GM Global Technology Operations LLC

( * ) Notice: Subject to any disclaimer, the term of this patent is extended or adjusted under 35 U.S.C. 154(b) by 660 days.

(21) Appl. No.: 12/407,278

(22) Filed: Mar. 19, 2009

(65) Prior Publication Data
US 2009/0260603 A1  Oct. 22, 2009

(30) Foreign Application Priority Data
Apr. 22, 2008 (DE) .......................... 10 2008 020 106

(51) Int. Cl.
*F02B 33/00* (2006.01)
*F02D 41/00* (2006.01)
*F02D 23/00* (2006.01)

(52) U.S. Cl. ........... 123/564; 123/563; 123/679; 60/602

(58) Field of Classification Search .................. 123/563, 123/564, 679; 60/602, 611
See application file for complete search history.

(56) References Cited

U.S. PATENT DOCUMENTS

| 4,470,394 A | 9/1984 | Tadokoro et al. |
| 5,190,016 A | 3/1993 | Takeda |
| 6,227,180 B1 | 5/2001 | Hoffmann et al. |
| 6,349,708 B1 | 2/2002 | Horlacher et al. |
| 6,378,506 B1 * | 4/2002 | Suhre et al. ................... 123/564 |
| 2008/0022677 A1 * | 1/2008 | Barbe et al. .................... 60/599 |

FOREIGN PATENT DOCUMENTS

DE  102008020106.5  4/2008
WO  WO 2006059950 A1 *  6/2006

* cited by examiner

*Primary Examiner* — Quyen Leung
*Assistant Examiner* — Jose Gonzalez Quinones

(57) ABSTRACT

A method and system for controlling an engine with a supercharger includes a bypass valve control module controlling a bypass valve for the supercharger having a bypass flow area in response to a desired manifold absolute pressure, an inlet valve control module controlling an inlet throttle for a supercharger in response to a bypass flow area and a port throttle control module controlling a port throttle in response to the desired mass airflow.

16 Claims, 3 Drawing Sheets

US 8,215,293 B2

SYSTEM AND METHOD FOR CONTROLLING A SUPERCHARGED ENGINE WITH INLET AND PORT THROTTLE

CROSS-REFERENCE TO RELATED APPLICATIONS

This application claims the benefit of German Application No. 102008020106.5 filed on Apr. 22, 2008. The disclosure of the above application is incorporated herein by reference.

FIELD

The present disclosure relates to internal combustion engines, and more particularly to a method of controlling a supercharger of the internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Inlet throttled supercharged engines are typically provided with two variable flow orifices or throttles to control the load of the engine. Control electronics and calibrations are required for each orifice. Typically, the engine drives a positive displacement charge compressor or supercharger which delivers charge air through a charge cooler to the inlet of the intake manifold. The supercharger receives charge airflow from a primary inlet throttle or valve, typically a blade (or butterfly) type inlet throttle (recently Electronic Throttle Control or ETC). A smaller secondary blade type bypass throttle or valve, controlled, for example, by a solenoid with a spring-over-diaphragm actuator is connected between the outlet of the charge cooler and the inlet of the supercharger. An exhaust gas recirculation (EGR) valve controls exhaust gas flow for emission reduction from the engine exhaust outlet to the charge compressor, downstream of the inlet throttle. The bypass function is typically the inverse of the inlet throttle such that, as the inlet throttle is opening, the bypass throttle is closing.

Improving fuel economy and engines, particularly direct-injection engines, is a major goal of engine manufactures. Providing bypass throttle and inlet throttle control alone may not provide enough control to substantially increase fuel economy in a direct-injection engine. More specifically, lower speeds and high load applications may require a different amount of control. Providing a bypass throttle and inlet throttle may not provide enough control to attain fuel economy increases.

SUMMARY

Accordingly, the present disclosure provides a system and method that includes a port throttle downstream of the supercharger that is controlled together with the inlet throttle and bypass throttle to coordinate the amount of airflow.

In one aspect of the disclosure, a method for controlling an engine with a supercharger includes determining a desired airflow for the engine, determining a desired manifold absolute pressure, controlling a bypass valve for the supercharger having a bypass flow area in response to the desired manifold absolute pressure, controlling an inlet throttle for the supercharger in response to the bypass flow area and controlling a port throttle in response to the desired airflow.

In a further aspect of the disclosure, a method for controlling an engine with a supercharger includes determining a desired airflow to an engine, determining a desired exhaust gas recirculation flow for the engine, determining a total desired inlet airflow from the desired airflow and the exhaust gas recirculation flow, determining a pressure ratio change based on the total desired inlet flow, controlling a bypass valve in response to the pressure ratio change, controlling the inlet throttle in response to and a bypass flow area and controlling a port throttle valve in response to the total desired inlet flow.

In yet another aspect of the disclosure, a control system for an engine with a supercharger includes a bypass valve control module controlling a bypass valve for the supercharger having a bypass flow area in response to a desired manifold absolute pressure, an inlet valve control module controlling an inlet throttle for a supercharger in response to a bypass flow area and a port throttle control module controlling a port throttle in response to the desired mass airflow.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
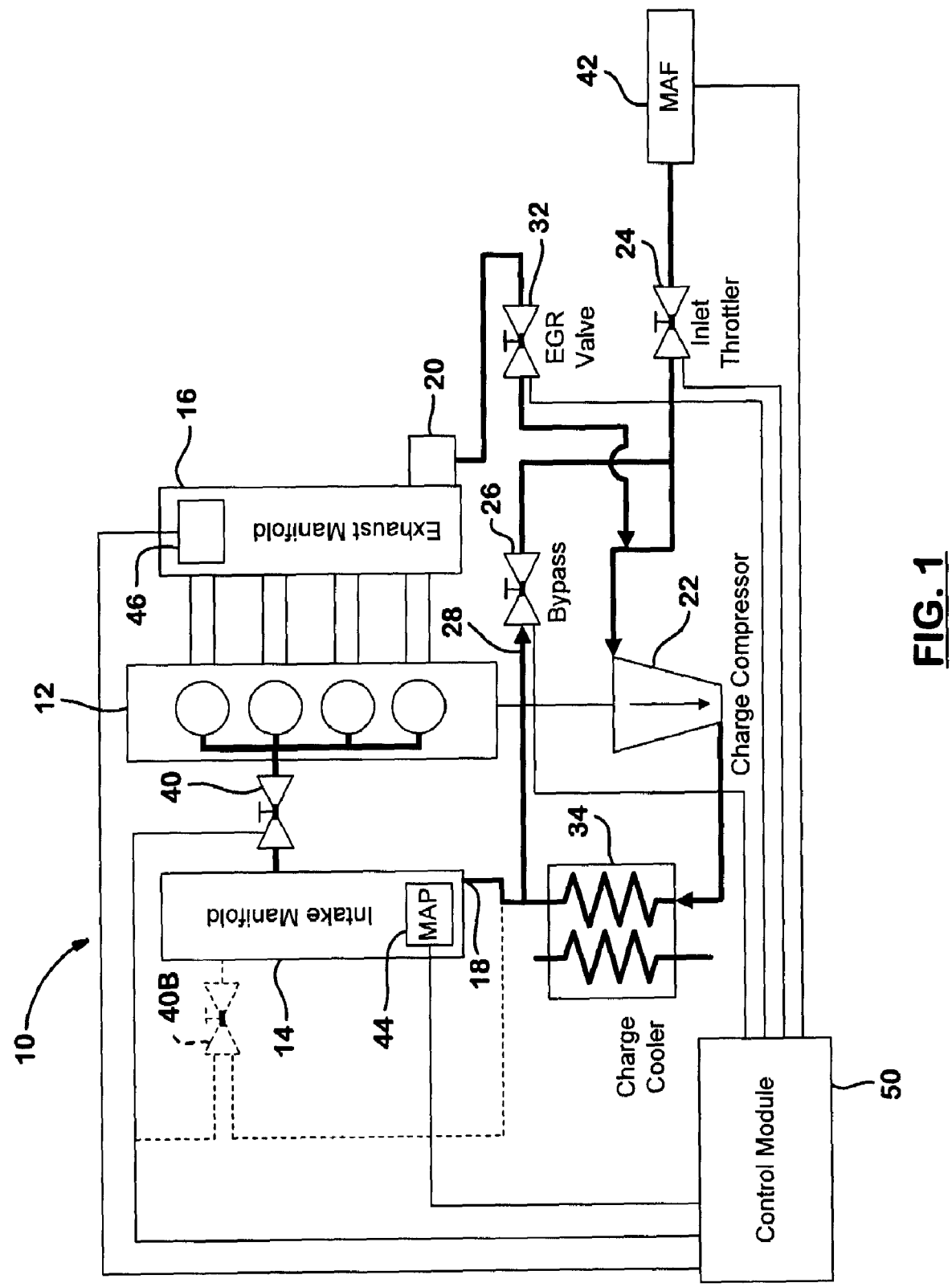
FIG. 1 is a functional block diagram of an engine system including supercharger according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 includes a cylinder block 12 having various number of cylinders, an intake manifold 14 and an exhaust manifold 16. The intake manifold includes an air inlet 18. The exhaust manifold 16 has an exhaust outlet 20. The engine 10 drives a supercharger 22. The supercharger 22 may be a positive displacement supercharger. The supercharger 22 may be driven in various ways including belt driven or gear driven. The supercharger 22 receives charged airflow from an inlet throttle 24. The inlet throttle 24 may be a blade or butterfly-type inlet throttle. A barrel-type throttle may also be used. The throttle is a valve that has an opening area that may be increased or decreased according to a control method as will be described below.

A bypass throttle 26 disposed within a bypass conduit 28 provides bypass flow into the intake manifold 14. The bypass throttle 26 bypasses inlet airflow around the supercharger 22.

An exhaust gas recirculation (EGR) valve 32 controls exhaust gas flow for emission reduction from the exhaust outlet 20 to the charge compressor 22 downstream of the inlet throttle 24. The EGR valve 32 also has a controllable opening area that can be increased or decreased according to a control method.

The inlet airflow from the EGR valve 32 and the inlet throttle 24 combine to form a total inlet airflow that is supercharged in the supercharger 22. The supercharger 22 has an outlet that is provided to a charge cooler 34. The charge cooler 34 cools the compressed inlet airflow prior to the intake manifold 14.

A port throttle or valve 40 which is illustrated between the intake manifold 14 and the cylinder block 12 is used to control the intake manifold pressure and the amount of intake air provided to the cylinders within the cylinder block 12. Although the port throttle 40 is illustrated between the intake manifold 14 and the cylinder block 12, the port throttle 40 may be disposed at various locations between the bypass conduit 28 and the cylinder block 12. For example, the port throttle 40 may be located prior to the intake manifold 14 in the intake airflow. The flow path, control path and port throttle 40B are illustrated in dotted lines for this alternate configuration. Valve 40 would be removed in such a situation.

A mass airflow sensor 42 generates a mass airflow signal corresponding to the mass of air in the intake of the system. The mass airflow signal can be used to control the flow control devices that do not have good pressure ratio signals such as the port throttle 40.

A manifold absolute pressure sensor 44 disposed within the intake manifold 14 generates a manifold pressure signal. The manifold absolute pressure signal may be used to determine the pressure ratio of the system and control the bypass valve or throttle 26 and the inlet throttle 24.

An exhaust manifold pressure sensor 46 may generate a pressure signal corresponding to the pressure of exhaust gases in the exhaust manifold.

A control module 50 is in communication with the mass airflow sensor 42, the manifold absolute pressure 44, the exhaust manifold pressure sensor 46, the EGR valve 32, the bypass valve 26 and the inlet throttle 24. As will be described below, the control module 50 independently controls the bypass valve 26 the inlet throttle 24 and the port throttle 40. To enable the combination of positive displacement supercharging and external cooled exhaust gas recirculation for improved fuel consumption both at high and low loads.

Figure 2:
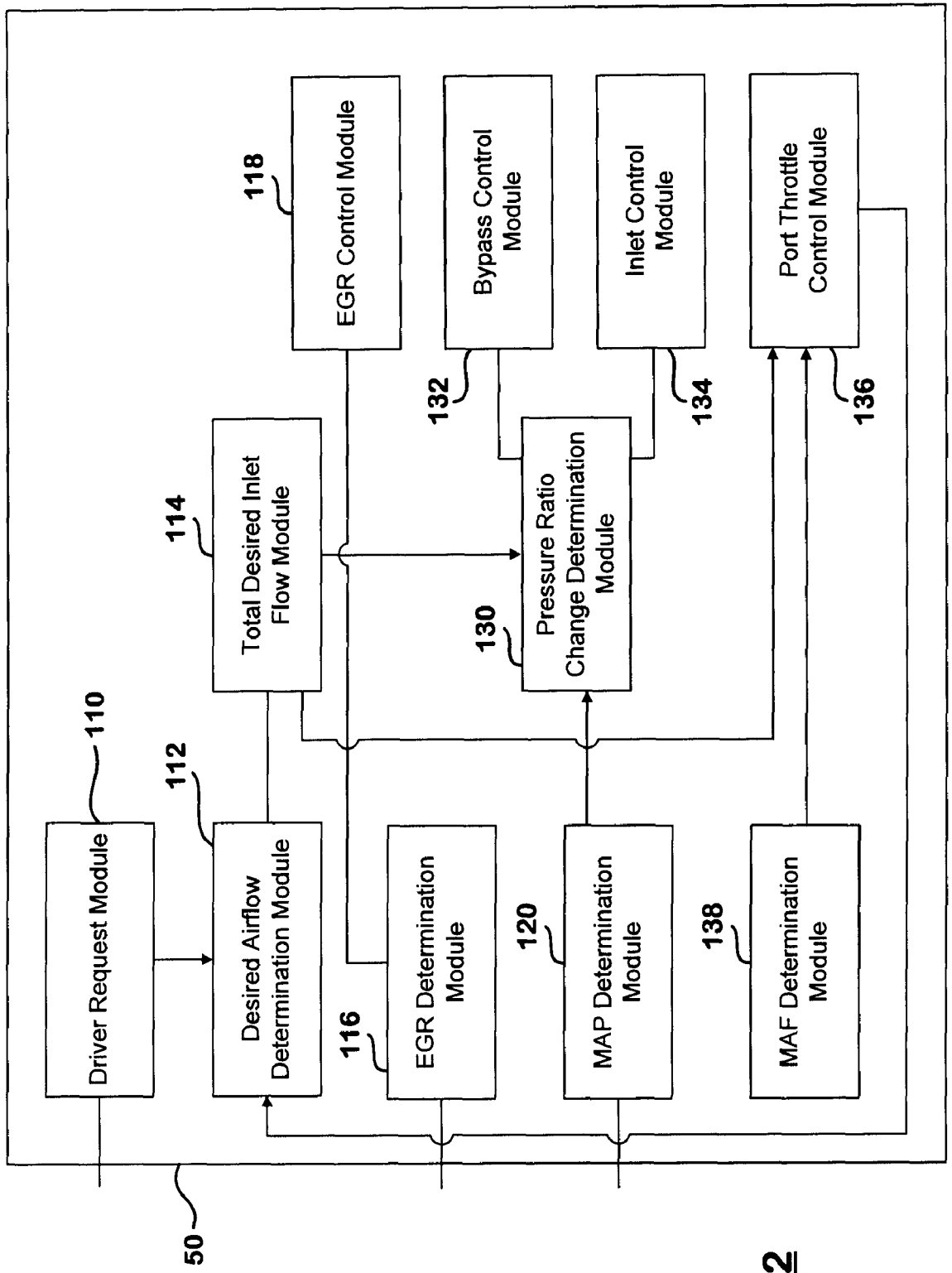
FIG. 2 is a functional block diagram of the controller of FIG. 1.

Referring now to FIG. 2, the control module 50 is illustrated in further detail. In block 110 a driver request module receives the driver request through the pedal in a conventional manner. The driver request may correspond to a torque signal. The driver request module communicates the driver request signal to the desired airflow determination module 112. The desired airflow determination module 112 converts the driver request signal such as a pedal signal into a desired airflow through the engine. The desired airflow determination module communicates a desired airflow signal to a total desired inlet flow module 114. The total desired inlet flow module 114 takes into consideration all of the desired inlet flow including a desired amount of exhaust gas recirculation.

The exhaust gas recirculation determination module 116 determines a desired exhaust gas recirculation signal based upon various considerations that are outside of the scope of this disclosure. The amount of exhaust gas recirculation can reduce the amount of emissions from tailpipe of the vehicle. The exhaust gas recirculation determination module 116 may also be in communication with an exhaust gas recirculation control module 118 that controls the opening and closing of the exhaust gas recirculation valve 32.

A manifold absolute pressure determination module 120 determines a manifold absolute pressure from the manifold absolute pressure sensor 44. The manifold absolute pressure determination module 120 communicates a manifold absolute pressure signal to a pressure ratio change determination module 130. The total desired inlet flow module 114 also communicates the total desired inlet flow to the pressure ratio determination module 130. The total desired inlet flow module 114 may provide the desired inlet flow or a manifold absolute pressure that corresponds to the inlet flow. The converted manifold absolute pressure may be converted in either the total desired inlet flow module 114 or the pressure ratio determination module 130. A pressure ratio change determination may be used to control the bypass control valve through the bypass control module 132 and the inlet control valve through the inlet control module 134. The inlet control valve may also be controlled based on the opening area of the bypass control valve. This may be performed when the bypass control valve is fully opened or closed.

The total desired inlet flow may also correspond to a desired mass airflow. The desired mass airflow is communicated to a port throttle control module 136. A mass airflow determination module 138 determines a measured mass airflow from the mass airflow sensor 42. By comparing the desired mass airflow from the desired inlet flow and the measured mass airflow, the port throttle can be adjusted. Also, the port control module 136 may be used to adapt the desired airflow when the measured airflow is changed.

Figure 3:
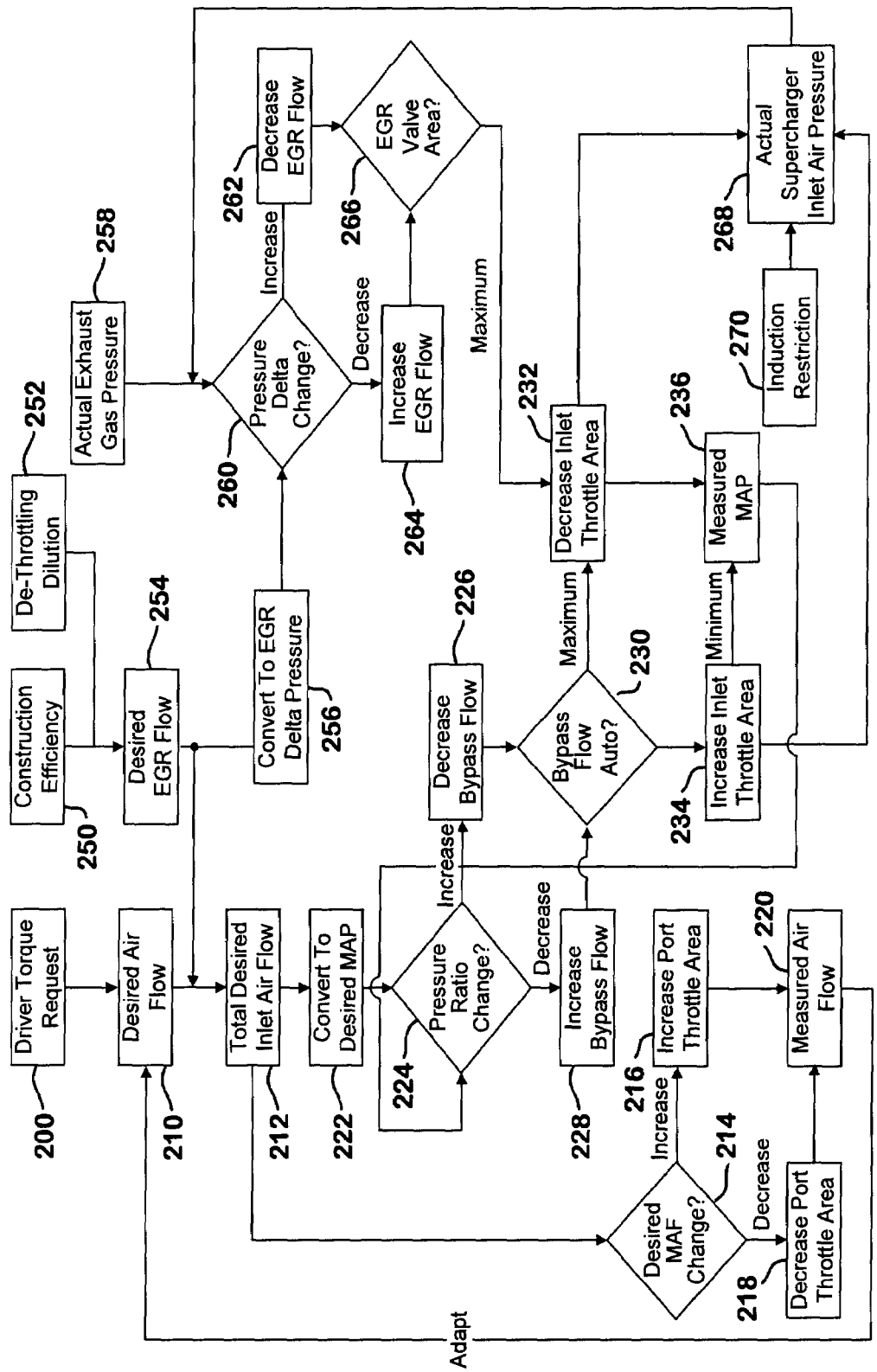
FIG. 3 is a flowchart illustrating steps executed by the system according to the present disclosure.

Referring now to FIG. 3, a method for controlling the inlet throttle and port throttle for a supercharged engine is set forth. In step 200 a driver torque request is received as an input from the driver. The driver torque request may come from a pedal sensor or other sensors. The driver torque request is converted into a desired airflow in step 210. The desired airflow is the desired airflow through the engine to achieve the torque request. In step 212, the total desired inlet airflow is determined. The total desired inlet airflow for the engine includes the desired exhaust gas recirculation airflow that will be described below. The total desired inlet airflow corresponds to a desired mass airflow.

The total desired inlet airflow determined in step 212 may be communicated to the decision block 214. When the desired airflow changes in step 214, an increase or decrease may take place in the port throttle area. In step 216 when the mass airflow increases from the total desired inlet airflow, the port throttle area is increased in step 216, which increases the airflow to the cylinders. In step 214 when the desired mass airflow change decreases, step 218 decreases the port throttle area, which closes the throttle and reduces the amount of air into the cylinders. After steps 216 and 218 the measured airflow is determined in step 220. After step 220 the measured airflow may be used to adapt the desired airflow in step 210. By adjusting the desired airflow the desired driver torque may be adjusted.

Referring back to step 212 the total desired inlet airflow from step 212 may be converted to a desired manifold absolute pressure (MAP) in step 222. The desired manifold absolute pressure can be used to determine a pressure ratio change corresponding to the pressure ratio between the inlet to the supercharger 14 and the outlet of the supercharger. When a pressure ratio change is determined in step 224 the bypass flow rate is changed by changing the bypass throttle opening. In step 224, when the pressure ratio change increases a decrease in the bypass flow rate is performed in step 226 by closing or reducing the opening area of the bypass throttle valve. In step 224 when the pressure ratio decreases the bypass flow rate increases in step 228 by opening the area of the bypass throttle. Increasing the bypass flow in step 228 reduces the amount of inlet air to the supercharger 22. Decreasing the bypass flow in step 226 increases the amount of inlet air passed through the supercharger 22. Thus decreasing the bypass flow increases the pressure ratio and increasing the bypass flow decreases the pressure ratio.

In step 230 it is determined whether or not the bypass flow area is at minimum or maximum which corresponds to a full opening or closing of the bypass throttle valve. In step 230 if the bypass flow area is maximized after step 228, step 232 decreases the inlet throttle area. In step 230 if the bypass flow area is minimum (after step 226) then step 234 increases the bypass flow area. After steps 233 and 234 step 236 measures the manifold absolute pressure and provides the manifold absolute pressure to the pressure ratio change determination step 224.

In step 250 the combustion efficiency of the engine is determined. In step 252 a desired de-throttling dilution 252 may also be determined. The combustion efficiency and the de-throttling dilution may be provided to a desired EGR flow step 254 that determines the desired exhaust gas recirculation for the engine. The desired exhaust gas recirculation flow is provided to step 212 as mentioned above. The desired exhaust gas flow may also be provided to a conversion step 256 that converts the desired exhaust gas recirculation to an EGR delta pressure or change in pressure. The delta pressure is a corresponding change in the EGR pressure for increasing the amount of exhaust gas recirculation into the supercharger 22. In step 258 the actual exhaust gas pressure from the exhaust gas manifold from the exhaust gas pressure sensor 46. In step 260 it is determined whether or not the delta change is an increase or a decrease by comparing the actual exhaust gas pressure to the change in the exhaust gas pressure. If the change in the pressure is an increase in step 260, step 262 decreases the exhaust gas recirculation flow by reducing the opening area in the exhaust gas recirculation valve 32 of FIG. 1. Step 260 if the pressure change is a decrease in the exhaust gas recirculation an increase in the amount of exhaust gas recirculation flow is provided in step 264. After steps 262 and 264 of the EGR valve area is maximum in step 266, step 232 is performed which decreases the inlet throttle area. After step 232, the actual supercharger inlet air pressure may be determined in step 268 which may also correspond to an induction restriction in step 270. The actual supercharger inlet air pressure may be provided to the pressure delta change block 260 described above.

The pressure ratio across the supercharger is minimized to minimize parasitic losses. The pressure ratios are minimized by managing recirculation flow. Propagation of pressure pulsation from the induction events and the supercharger rotor-passing frequency may be reduced by throttling the inlet to the supercharger. The port throttle and the throttling of the inlet are coordinated so the desired mass flow is achieved. Port throttles, especially those of having a barrel section, are capable of modulating the in-cylinder mixture motion by varying the mean velocity and centroid of the incoming flow relative to the port centerline. The in-cylinder mixture motion can be used to bias turbulent intensity for increased burn rates, for dilution tolerance and increased sheer flow and for reduced bore-wall fuel impingement on direct injection engines. Port throttles are also beneficial at idle by limiting the volume of backflow during the overlap period by providing a large pressure drop close to the intake valve which decreases the dilution quantity and reduces the sensitivity to valve events. By combining the benefits of positive displacement supercharging for improved response with aggressive downsizing, fuel efficiency may be improved. Frequent operation at high brake mean effective pressure induces losses to reduce combustion efficiency from knock. Introducing cooled EGR improves combustion efficiency by reducing combustion temperatures with high specific-heat dilutant and a positive displacement roots-type blower is insensitive to condensate when EGR is introduced upstream. The presence of cooled EGR for high load combustion efficiency may also be utilized for pumping work reduction at part load, thereby potentially creating cost offsets by eliminating cam phasing. Increasing reduction and pumping work can be realized by increasing dilution tolerance which can be primarily achieved by increasing mixture motion for increased turbulent intensity at ignition. Barrel-type port throttles may be useful for managing external dilution both by increasing mixture motion at part load and modulating both dilutant and fresh charge during throttle transients. Ducting EGR between the exhaust port and the supercharger inlet provides a point with potential large pressure delta at all operating conditions, with the inlet throttle providing variable depression for finer flow rate control of the dilutant.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method for controlling an engine with a supercharger comprising:
   determining a desired airflow for the engine;
   determining a desired manifold absolute pressure;
   controlling a bypass valve for the supercharger having a bypass flow area in response to the desired manifold absolute pressure;
   controlling an inlet throttle for the supercharger in response to the bypass flow area;
   controlling a port throttle in response to the desired airflow;
   determining a total desired inlet airflow from the desired airflow and a desired exhaust gas recirculation (EGR) flow;
   increasing exhaust gas flow by increasing an EGR valve opening area; and
   when the EGR valve opening area is maximized, decreasing an inlet throttle area while decreasing the bypass flow area to increase exhaust gas recirculation flow.

2. A method as recited in claim 1 wherein when the EGR valve opening area is maximized, the decreasing of the inlet throttle area is performed while simultaneously decreasing the bypass flow area to increase exhaust gas recirculation flow.

3. A method as recited in claim 1 wherein determining a desired airflow for the engine comprises determining a desired airflow for the engine from the total desired inlet airflow.

4. A method as recited in claim 1 wherein controlling a port throttle in response to the desired airflow comprises increasing a port throttle area to increase an inlet airflow and decreasing the port throttle area to decrease the inlet airflow.

5. A method as recited in claim 1 wherein controlling a bypass valve for the supercharger comprises decreasing the bypass flow area to increase a supercharger pressure ratio and increasing the bypass flow area to decrease the supercharge pressure ratio.

6. A method as recited in claim 5 wherein controlling an inlet throttle comprises decreasing the inlet throttle area when bypass flow area is maximized to decrease the supercharger pressure ratio and increasing the inlet throttle area when bypass flow area is minimized to increase the supercharger pressure ratio.

7. A method for controlling an engine with a supercharger comprising:
   determining a desired airflow to an engine;
   determining a desired exhaust gas recirculation flow for the engine;
   determining a total desired inlet airflow based on the desired airflow and the exhaust gas recirculation flow;
   determining a pressure ratio change based on the total desired inlet airflow;
   controlling a bypass valve in response to the pressure ratio change;
   controlling an inlet throttle in response to a bypass flow area;
   controlling a port throttle valve in response to the total desired inlet airflow; and
   controlling the inlet throttle while decreasing the bypass flow area in response to increasing the desired exhaust gas recirculation flow.

8. A method as recited in claim 7 further comprising controlling an exhaust gas recirculation valve in response to the desired exhaust gas recirculation flow.

9. A method as recited in claim 8 wherein the controlling an exhaust gas recirculation valve, controlling a bypass valve, controlling the inlet throttle and controlling the port throttle valve are performed independently.

10. A method as recited in claim 7 wherein the controlling of the inlet throttle is performed while simultaneously decreasing the bypass flow area in response to increasing the desired exhaust gas recirculation flow.

11. A method as recited in claim 7 further comprising controlling the inlet throttle in response to the desired exhaust gas recirculation flow when an exhaust gas recirculation valve is fully opened or fully closed.

12. A system comprising:
   an engine;
   a supercharger in communication with the engine;
   a bypass valve;
   an exhaust gas recirculation valve;
   a port throttle;
   an inlet throttle; and
   a control system comprising:
      a bypass valve control module controlling the bypass valve for the supercharger having a bypass flow area in response to a desired manifold absolute pressure,
      an inlet throttle control module controlling the inlet throttle for the supercharger in response to the bypass flow area,
      a port throttle control module controlling the port throttle in response to a desired mass airflow, and
      an exhaust gas control module increasing exhaust gas flow by increasing an opening area of the exhaust gas recirculation valve,
      wherein when the opening area of the exhaust gas recirculation valve is maximized, the inlet throttle control module decreases an inlet throttle area while decreasing the bypass flow area to increase exhaust gas flow.

13. A system as recited in claim 12 wherein the engine comprises a direct injection engine.

14. A system as recited in claim 12 wherein when the opening area of the exhaust gas recirculation valve is maximized, the inlet throttle control module decreases the inlet throttle area while simultaneously decreasing the bypass flow area to increase exhaust gas flow.

15. A system as recited in claim 12 wherein the port throttle control module increases a port throttle area of the port throttle to increase an inlet mass airflow and decrease the port throttle area to decrease the inlet mass airflow.

16. A system as recited in claim 12 wherein bypass valve control module decreases the bypass flow area of the bypass valve to increase a supercharger pressure ratio and increase the bypass flow area to decrease the supercharger pressure ratio.

* * * * *